United States Patent

[11] 3,598,926

[72] Inventor Hiroyuki Umeda
Yokohama, Japan
[21] Appl No. 793,462
[22] Filed Jan. 23, 1969
[45] Patented Aug. 10, 1971
[73] Assignee Victor Company of Japan
Yokohama, Japan
[32] Priority Jan. 25, 1968, May 15, 1968, Apr. 12, 1968
[33] Japan
[31] 43/4448, 43/39,287 and 43/23,984

[54] MAGNETIC RECORDING AND REPRODUCING APPARATUS OF THE AUTOMATIC TAPE THREADING SYSTEM
7 Claims, 19 Drawing Figs.

[52] U.S. Cl. 179/100.2 T, 242/195
[51] Int. Cl. G11b 15/32
[50] Field of Search 179/100.2 T; 242/192, 195, 197, 198

[56] References Cited

UNITED STATES PATENTS

| | | | |
|---|---|---|---|
| 3,208,682 | 9/1965 | Pastor | 242/195 |
| 3,227,387 | 1/1966 | Laa | 242/195 |
| 3,297,267 | 1/1967 | Wiggs | 242/195 |

*Primary Examiner*—Leonard Forman
*Assistant Examiner*—Dennis A. Dearing
*Attorney*—Louis Bernat

ABSTRACT: A magnetic tape recording and reproducing apparatus includes an automatic tape threading system comprising a supply reel of magnetic tape. A normally straight and flexible tape leader portion is connected to the leading end of the magnetic tape. A delivery roller unwinds the magnetic tape from the supply reel and guides the tape leader portion to preclude contact between the leader and a magnetic head. The tape itself is deflected from the path followed by travel of the tape leader portion and is brought into contact with the magnetic head. A takeup reel automatically catches the tape leader portion and loads the apparatus with the magnetic tape.

PATENTED AUG 10 1971

3,598,926

SHEET 01 OF 10

INVENTOR
HIROYUKI UMEDA

BY

ATTORNEY

INVENTOR
HIROYUKI UMEDA
BY Louis Bernat
ATTORNEY

INVENTOR
HIROYUKI UMEDA
BY Louis Bernat
ATTORNEY

INVENTOR
HIROYUKI UMEDA
BY [signature]
ATTORNEY

INVENTOR
HIROYUKI UMEDA
BY Louis Bauer
ATTORNEY

INVENTOR
HIROYUKI UMEDA
BY [signature]
ATTORNEY

INVENTOR
HIROYUKI UMEDA
BY [signature]
ATTORNEY

INVENTOR
HIROYUKI UMEDA
BY [signature]
ATTORNEY

INVENTOR
HIROYUKI UMEDA

BY Lou Bernat
ATTORNEY

INVENTOR
HIROYUKI UMEDA
BY [signature]
ATTORNEY

MAGNETIC RECORDING AND REPRODUCING APPARATUS OF THE AUTOMATIC TAPE THREADING SYSTEM

The present invention relates to a magnetic recording aNd reproducing apparatus having an automatic tape threading system. More particularly, the invention deals with a device for automatically loading a magnetic tape so that it can be unwound from a supply reel, passed around a guide drum, and wound on a takeup reel.

In prior art devices, it has been customary to hand load a magnetic recording and reproducing apparatus with a magnetic tape. The tape is unwound from a supply reel and wound on a takeup reel. It has hitherto been customary to thread the tape through a predetermined path of travel for bringing the tape into engagement with a guide roller, magnetic heads, a capstan, a pinch roller, and a guide roller. Finally, the leading end of the tape is inserted in a groove in a hub of the takeup reel. This threading operation is generally performed by hand. It is troublesome, and many errors have often been committed while threading the tape. When such an error is committed, it becomes impossible to transport the tape. Consequently, it becomes impossible to record on and reproduce from the tape. This type of threading error is most likely to be committed when a video tape recorder having a complicated tape travel passage, is loaded with a magnetic tape.

The present invention eliminates the aforementioned disadvantages and makes it possible to automatically load the magnetic tape by automatically threading the tape through a predetermined path of travel.

Accordingly, a primary object of the invention is to provide an automatic tape threading system in a magnetic recording and reproducing apparatus. Automatic loading occurs when a magnetic tape is automatically unwound from a supply reel and wound on a takeup reel. The tape automatically threads through a predetermined path of travel.

Another object of the invention is to provide an automatic tape threading system in a magnetic recording and reproducing apparatus. The magnetic tape is automatically threaded through a predetermined path of travel and wound on a takeup reel when a tape cartridge having a supply reel built thereinto is inserted into the magnetic recording and reproducing apparatus.

Another object of the invention is to provide for the tape portion to come into contact with a guide drum without allowing the tape leader to come into contact with said guide drum.

Still another object of the invention is to provide a magnetic recording and reproducing apparatus having an automatic tape threading system for pulling the tape leader portion and the magnetic tape attached thereto, without damaging the leader portion in any way.

A further object of the invention is to provide an automatic tape threading system which precludes removal of a tape cartridge having a built-in supply reel from the magnetic recording and reproducing apparatus when the tape has been unwound from the tape cartridge.

Additional objects and advantages of the invention will become more apparent from a consideration of the following description when taken in conjunction with the accompanying drawings, in which.

Figure 1:
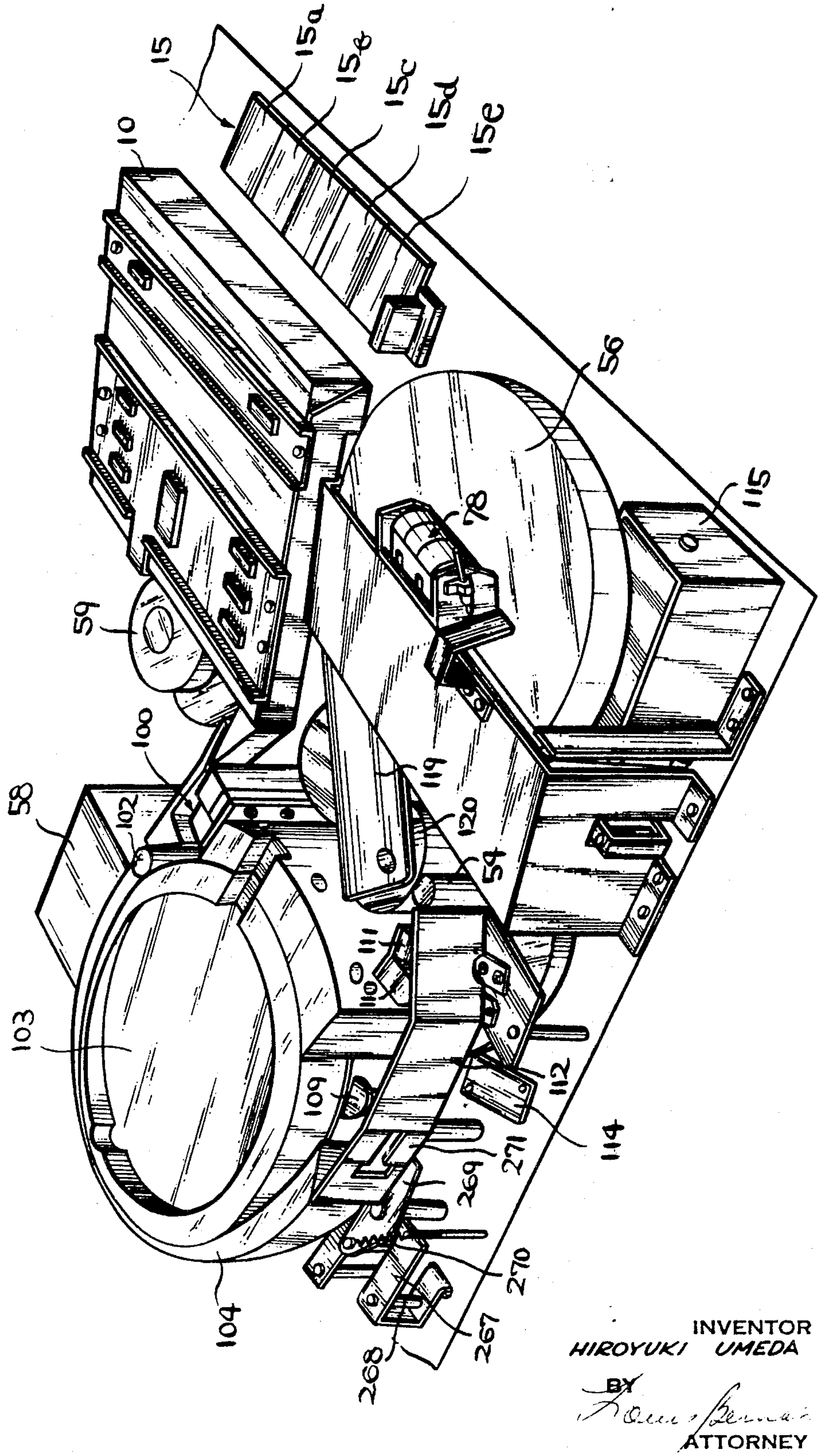
FIG. 1 is a perspective view of one embodiment of the apparatus according to this invention.
Figure 2A:
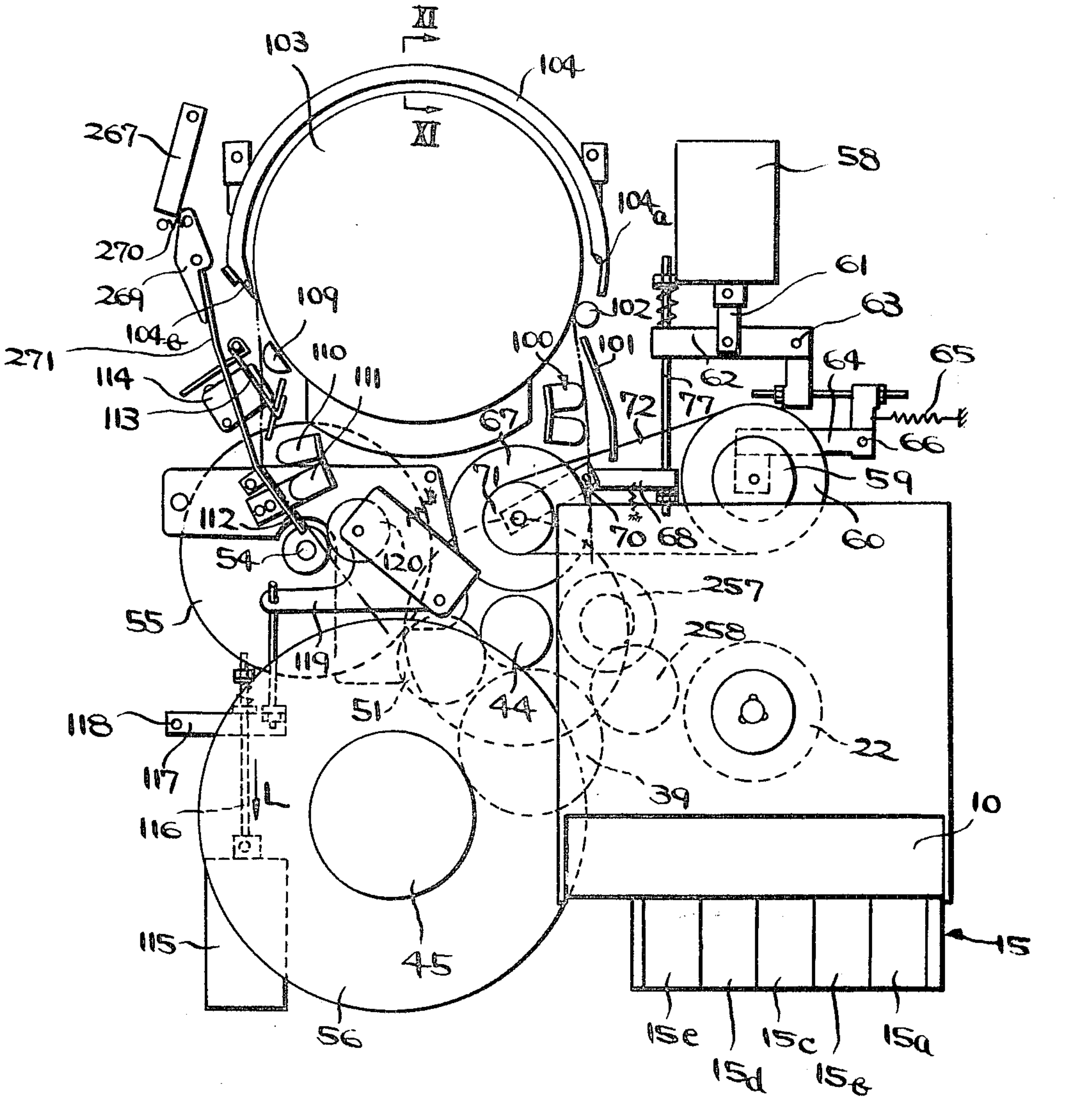
FIGS. 2A and 2B are schematic plan views of the embodiment of FIG. 1.
Figure 2B:
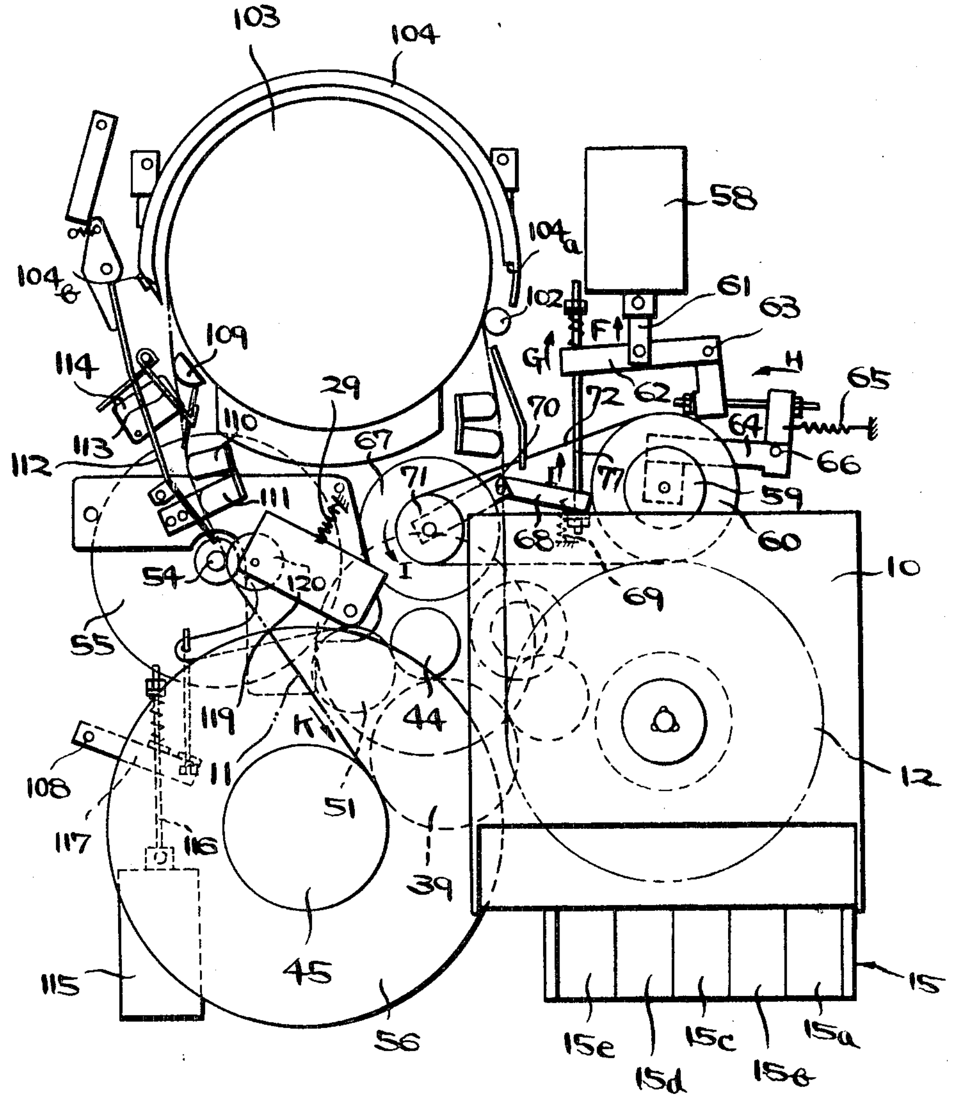
Figure 15:
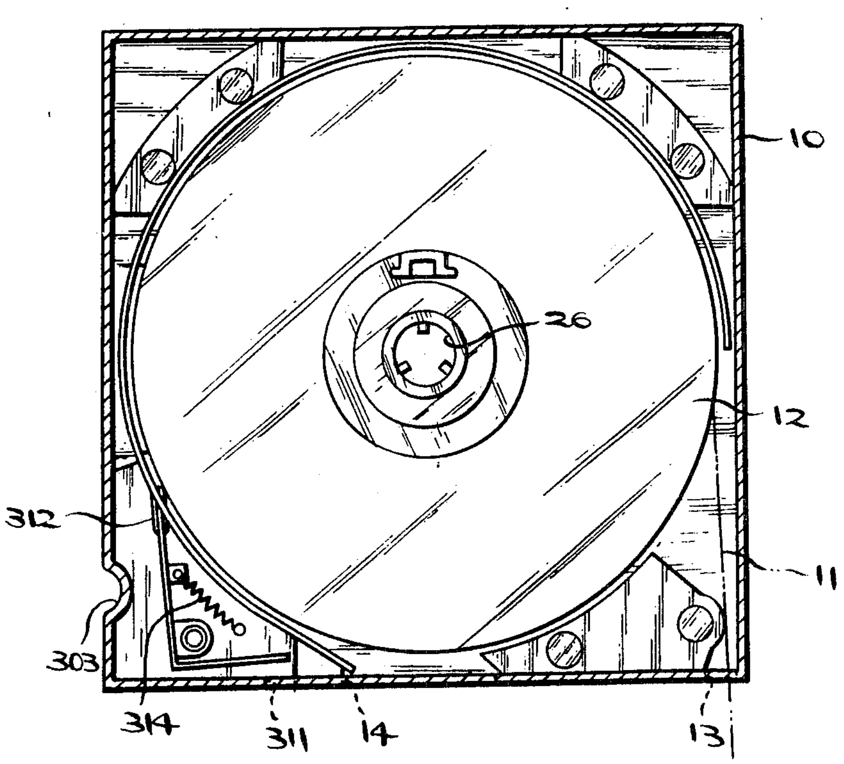
FIG. 14 and FIG. 15 are a front view and a plan view, with the upper plate being removed, of the tape cartridge respectively.
Figure 14:
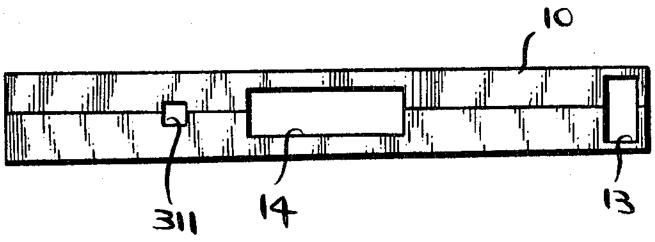

The operation of an automatically loading magnetic recording and reproducing apparatus will be explained next. According to this invention, a magnetic tape cartridge 10 is inserted in the chassis of magnetic recording and reproducing apparatus, at a predetermined position as shown in FIG. 1 and FIGS. 2A and 2B. As shown in FIG. 14 and FIG. 15, the tape cartridge 10 rotatably mounts a supply reel 12 therein. A magnetic tape 11 is wound in convolutions on the reel 12.

The front end of the tape cartridge 10 is formed with openings 13 and 14. The openings 13 and 14 face forwardly when the tape cartridge 10 is inserted in the chassis of the apparatus. Pushbuttons 15 include a tape cartridge removal button *15a*; a recording and playback button *15b*, a tape fast winding button *15c*, a tape travel stopping button *15d*, and a tape rewinding button *15e*. When a program is to be recorded on or reproduced from the tape, the recording and playback button *15b* is pushed.

Figure 3:
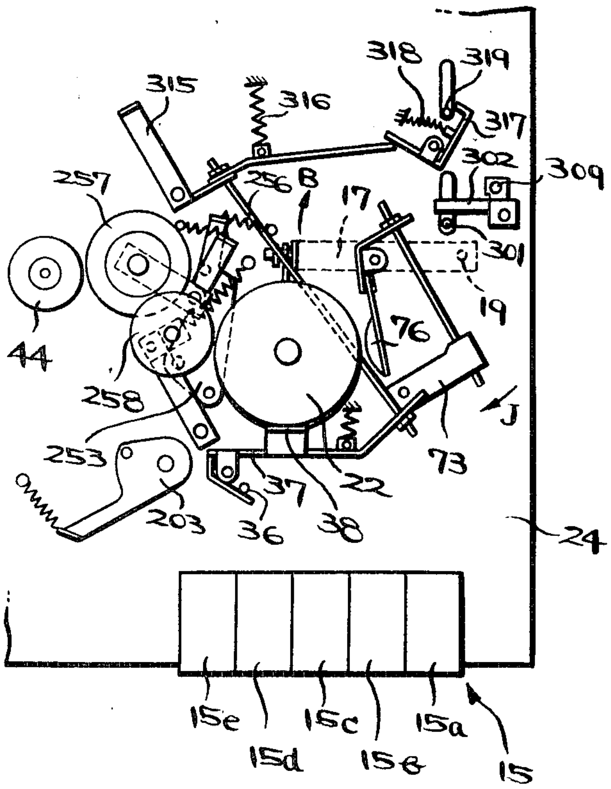
FIG. 3 and FIG. 4 are a plan view and a side view, respectively, of a supply reel disc and a mechanism associated therewith.
Figure 4:
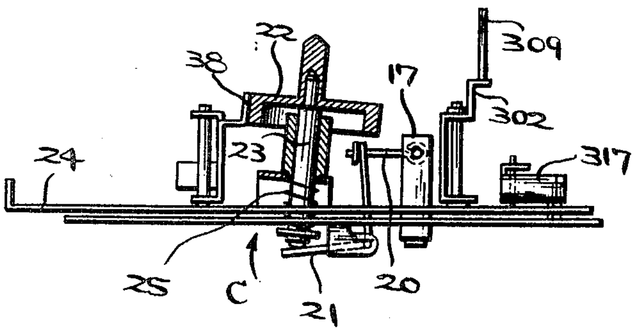

As the button *15b* is pushed, a sliding lever 16 (FIG. 5) moves in sliding motion in the direction of arrow A. At its forward end, the lever 16 pushes a pin 18 mounted on an arm 17. The arm 17 is moved in pivotal motion about an arbor 19, the movement being in the direction of arrow B (FIGS. 3 and 4). An L-shaped lever 21 (FIG. 4) is connected to the arm 17 through a connector 20. The lever 21 is moved in a pivotal motion in the direction of arrow C.

An arbor 23, supporting a reel disc 22, can be moved upwardly in a sliding motion. The reel disc 22 is inclined forwardly with respect to a horizontal disk 24. The arbor 23 is normally urged downwardly by a spring 25. When the button *15b is normal (not pushed), the reel disc 22 is in its lowermost position. This position will not prevent the insertion of so as not to prevent the insertion of the tape cartridge 10. However, upon pushing the button 15b*, the reel disc 22 is moved upwardly. A projection on the reel disc 22 is received in a center opening 26 (FIG. 15) formed in the supply reel 12 of the tape cartridge 10. The reel disc 22 and the supply reel 12 rotate as a unit.

Also, upon the sliding movement of the lever 31, in the direction of arrow D, a pin 41 (FIG. 7) mounted on an idler lever 40 (provided with an idler 39) is brought into engagement with a cam portion 42 of the lever 31. The biasing force of a spring 43 pulls the lever 40, which moves slightly, in the counterclockwise direction. The idler 39 is brought into engagement with a motor pulley 44 mounted on the rotary shaft of a motor (not shown). This idler drives a takeup reel disc 45. Thus, the power of the motor is transmitted to the reel disc 45, and a takeup reel 56 begins to rotate.

The sliding movement of the lever 31 (in the direction of arrow D) also brings a pin 47, on a pivoting lever 46, into engagement with a cam portion 48 of the lever 31. The lever 46 pivots against the biasing force of a spring 50 and moves in the counterclockwise direction about an arbor 49.

Accordingly, an idler lever 52 (mounting an idler 51) is released from engagement with the lever 46, at its end portion. Instead, the biasing force of a spring 53 brings lever 52 into engagement with the pulley 44 and a flywheel 55 of a capstan 54. Thus, the power of the motor is transmitted to the flywheel 55, and the capstan 54 begins to rotate.

Figure 16:
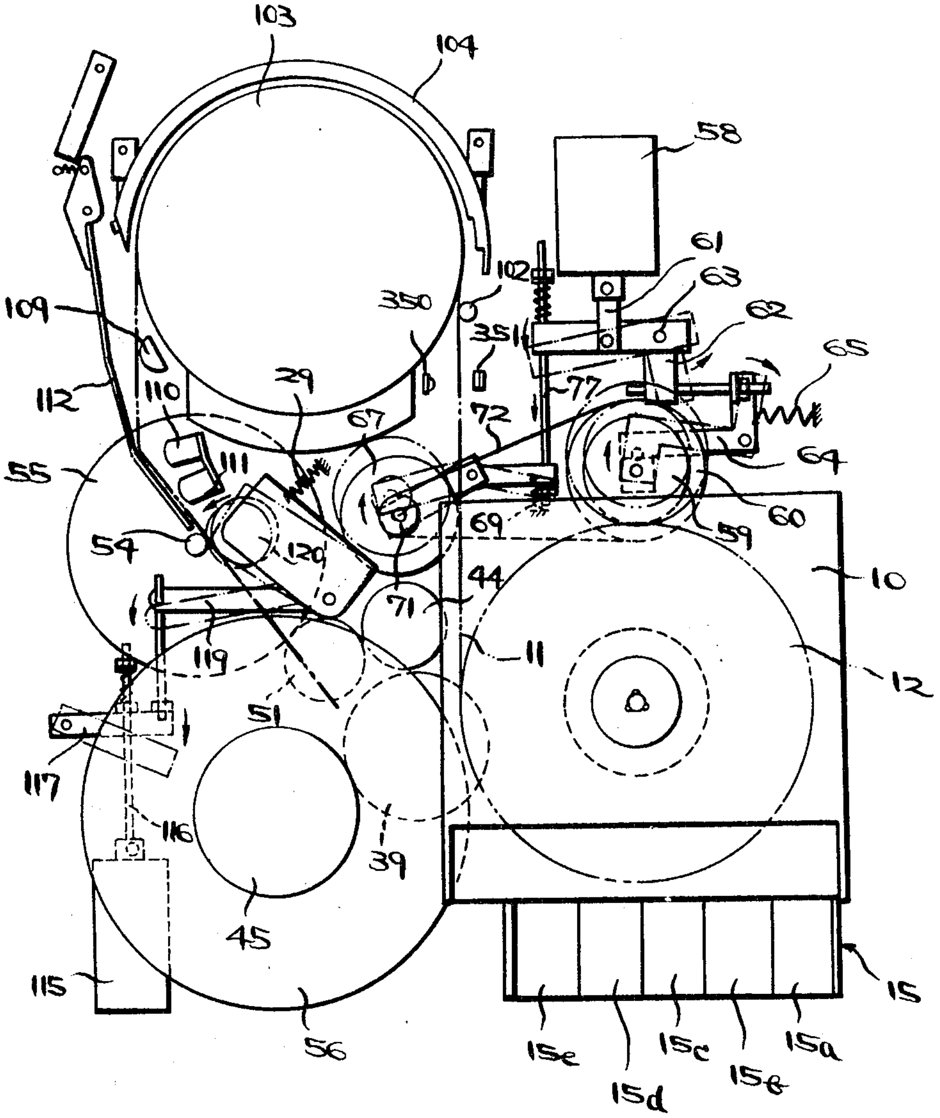
FIG. 16 is a schematic plan view of another embodiment of the apparatus according to this invention in which is provided another tape detecting means.

Pivotal movement of the lever 46 in the counterclockwise direction pushes a microswitch 57 at its left end so that the power source circuit for a plunger 58 (FIG. 16) is closed.

Before the apparatus is put into operation, a delivery roller 59 and a pulley mounted on a single arbor are disposed in a position, as shown in FIG. 2B. However, actuation of the plunger 58 causes a sliding bar 61 to be pulled in the direction of arrow F. A lever 62 pivots about an arbor 63 in the direction of arrow G. A lever 64, mounting the roller 59, pivots about an arbor 66 in the direction of arrow H, against the biasing force of a spring 65. Accordingly, the delivery roller 59 also moves in the direction of arrow H and into a position, as shown in FIG. 2A.

The roller 59 enters into the tape cartridge through the opening 14 (FIG. 14) and is brought into contact with a roll of tape wound on the supply reel 12. A lever 68 (FIG. 2B), mounting an idler 67, is connected to the lever 62 through a connector rod 77. As the layer 62 pivots, against the biasing force of a spring 69, the lever 68 moves about an arbor 70 of arrow I. This brings the idler 67 into engagement with the pulley 44 which transmits rotational power thereto. A pulley 71 and the idler 67 are mounted on the same arbor. Rotation of the motor is transmitted through a belt 72 trained around the pulleys 60 and 71. The pulley 60 turns the roller 59 which is in engagement with the tape 11 wound on the supply reel 12. Thus, the tape 11 is delivered through the opening 13 of the tape cartridge 10.

When the sliding lever 16 (FIG. 5) moves in its sliding motion, a pin 74, mounted on a lever 73, is brought into engagement with a cam portion 75 of the lever 16. This causes the lever 73 to pivot in the direction of arrow J. This brings a pad 76 into engagement with the reel disc 22, to thereby impart a proper back tension to the tape 11 as it is delivered from the supply reel 12.

As aforementioned, the tape 11 (FIG. 2A), unwound from the supply reel 12, is passed between an erase head assembly 100 and a tape guide 101, and between a guide pole 102 and a guide drum 102. Magnetic rotary heads (not shown) are positioned in drum 103 for recording and reproducing video signals. At the drum, the tape is moved into a tape leader guide 104 which is mounted along substantially half the circumference of the guide drum 103. Guide 104 is spaced apart from the drum by a small distance. The tape leader guide is follows an oblique or spiralling path over the circumferential surface of the guide drum, on which magnetic heads are mounted.

Figure 10:
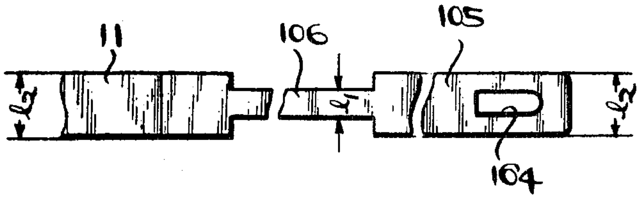
FIG. 10 is a front view of a magnetic tape and a tape leader portion connected to the leading end of said magnetic tape.
Figure 11:
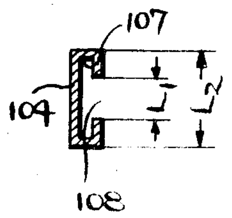
FIG. 11 is a longitudinal sectional side view of the tape leader guide, taken along the line XI–XI in FIG. 2A.

As shown in FIG. 10, a normally straight first tape leader portion 105 is made of a relatively hard flexible material. The leader has a width $l_2$ which is equal to the width $l_2$ of the tape 11. A second tape leader portion 106 is of a flexible material which is not as hard as the first tape leader portion 105. The portion 106 has a width $l_1$ which is smaller than the width $l_2$ of the tape 11. These two leader portions are connected to the leading end of the tape 11, with the first tape leader portion 105 forming the foremost end of the tape 11. The second tape leader portion 106 is a material which is so soft that it cannot damage the tip of the rotary magnetic heads mounted in the guide drum 103. As shown in FIG. 11, the leader guide 104 is formed with a tape passage 107 and an opening 108. It has a C-shaped cross section. The width $L_2$ of the passage 107 and the width $L_1$ of the opening 108 are selected so that $l_1 < L_1 < l_2 < L_2$.

The first tape leader portion 105 finds its way into the passage 107 via one end 104*a* (FIG. 2A) of the tape guide 104. As the tape 11 is unwound from the supply reel 12, it moves along the curvature of the guide 104, to the other end 104*b* where it leaves the guide. The second tape leader portion 106 follows the first tape leader portion 105 as it is unwound from the supply reel 12. The second tape leader portion 106 does not find its way into the tape guide 104 because the width $l_1$ thereof is smaller than the width $L_1$. Therefore, leader 106 passes through the opening 108 of the tape guide 104. The tape 11 follows the second tape leader portion 106 which also moves obliquely across the face of drum 103.

As the first tape leader portion 105 emerges from the other end 104*b* of the tape guide 104, it passes by a guide pole 109, and between a fixed magnetic head assembly consisting of an aural head 110 and a control signal head 111. The tape further passes through a tape guide 112, and between the capstan 54 and a pinch roller 120 as it moves toward the takeup reel 56. Preferably, the first tape leader portion 105 is long enough so that its foremost end is wound on the takeup reel 56 while its rearmost end is still wound on the supply reel 12.

Figure 12:
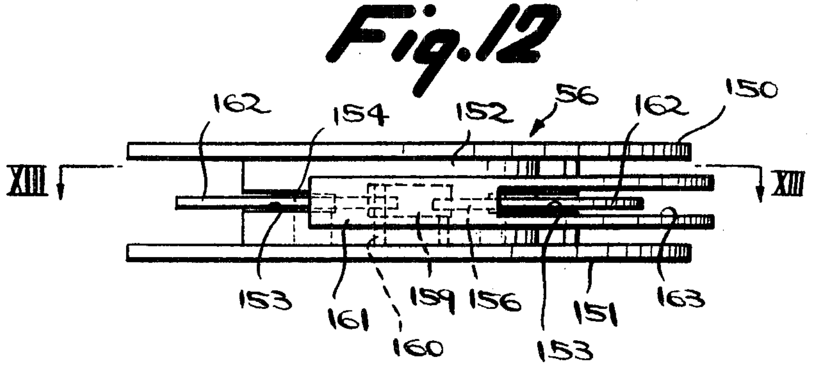
FIG. 12 and FIG. 13 are a side view and a transverse sectional plan view, respectively, taken along the line XIII–XIII of the automatic tape takeup reel.
Figure 13:
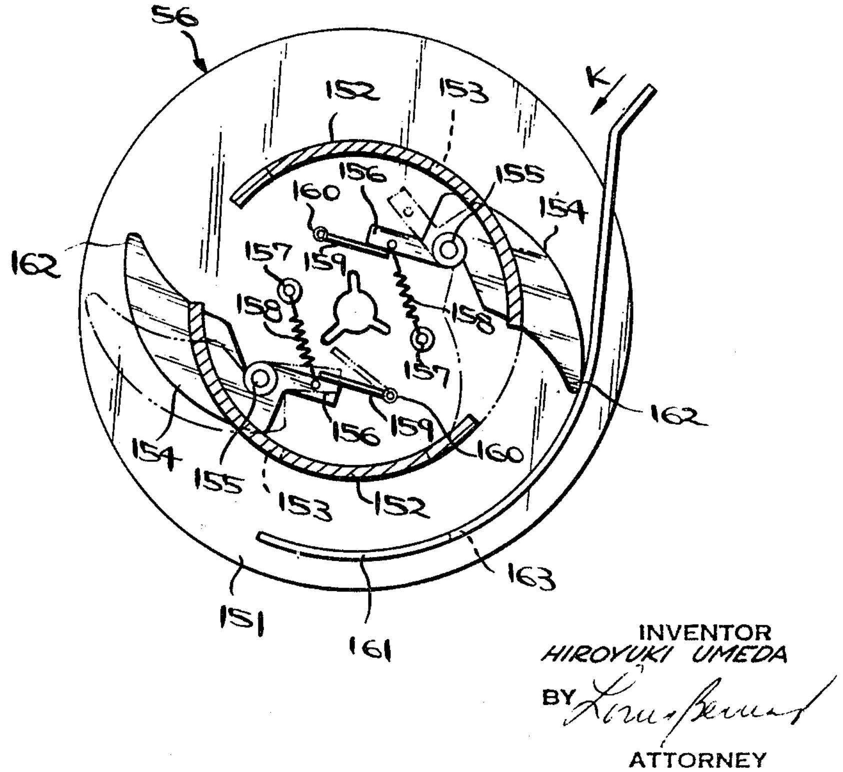

FIGS. 12 and 13 show the takeup reel 56 which includes an upper flange 150, a lower flange 151 and a reel hub 152 disposed between said upper and lower flanges. The reel hub 152 is formed with two sections. Each section has a groove 153 on its peripheral surface. Each of two pawls 154 is pivotally mounted on an arbor 155 to swing in the groove 153 and project beyond the peripheral surface of the reel hub 152.

At all times each of the pivotal pawls 154 is urged in the counterclockwise direction by a spring 158 mounted between its base 156 and a pin 157. Before the tape is wound on the takeup reel 56, the pivotal pawl 154 is disposed in the position shown in full lines in FIG. 13. The base 156 is pulled under the influence of a leaf spring 159 having a resilient force which is greater than the resilient force of spring 158. The leaf spring 159 is secured in position by a pin 160. When the pivotal pawl 154 is forced to pivot in the counterclockwise direction, it moves from the position shown in full lines in FIG. 13. The leaf spring 159 is pushed by the base 156 of the pivot pawl 154 and is flexed in the clockwise direction.

The first tape leader portion 105 is fed in the direction of arrow K to the takeup reel 56 (FIG. 13). The leader portion 105 first moves along a tape guide 161. Each of the pivotal pawls 154 has a forward end 162 which is received in a groove 163 of the tape guide 161 while the pawl is moving in a pivotal motion. The tape guide portion 105 is formed with a slot 164 in its forward end portion (FIG. 10). One of the pivotal pawls 154 slips into the slot 164 and catches the tape leader portion 105. The forward end 162 of the pawl fits into the slot 164 and pulls the tape 11 as the takeup reel 56 is rotated.

When the forward end 162 of the pawl 154 is received in the slot 164, the pawl 154 is urged in the counterclockwise direction. The forward end 162 is subjected to a force of impact applied by the tape 11. At this time, the pivotal pawl 154 pushes the leaf spring 159 at its base 156. Thus, the force of the impact is absorbed and attenuated by the resilient force of the leaf spring 159. The pivotal pawl leaf spring 159 absorbs the impact force applied to the pawl 154 by the tape 11. Then, the pawl 154 pivots in the clockwise direction by the tension of the leaf spring 159. Furthermore, after the reel 56 has made substantially one revolution with the pawl 154 catching the first tape leader portion 105, the forward end 162 of the pivotal pawl 154 is again brought into contact with the first tape leader portion 105. However, since there is no slot formed therein at this point, the pawl 154 is forced in the clockwise direction against the biasing force of the spring 158, and it disappears into the groove 153. The back portion of the pawl is disposed along the peripheral surface of the reel hub 152. The first tape leader portion 105 is caught by the forward end 162. As the reel 56 rotates further, the pivotal pawl 154 remains submerged in the groove 153. Thus the second tape leader portion 106 and the tape 11 are continuously wound around the hub 152 of the takeup reel 56, following the first tape leader portion 105.

The first tape leader portion 105 or the tape 11 is wound on the takeup reel 56. The tape leader portion or the tape assumes a position as shown in full lines in FIG. 2B due to the back tension of the tape. A tape detection arm 113 pivots in the counterclockwise direction from a position shown in FIG. 2A. At its end, the arm 113 pushes the button of a microswitch 114 to close the same. As actuated, a sliding bar 116 is pulled in the direction of arrow L. A lever 117 rotates in the clockwise direction about an arbor 118. Accordingly, a lever 119 pivots in the counterclockwise direction. A pinch roller 120, mounted on said lever 119, is also moved in a pivotal motion in the counterclockwise direction to bear against the capstan 54. The tape 11 is held between the rotating capstan 54 and the pinch roller 120, and it moves in the direction of arrow K.

When the microswitch 114 is actuated, the plunger 58 is rendered inoperative simultaneously with the operation of the plunger 115.

Accordingly, the levers connected to the plunger 58 are moved in a direction opposite to the direction of arrow F shown in FIG. 2B. The delivery roller 59 is moved away from the tape 11 wound on the supply reel 11. Thus, the tape 11 is moved at a predetermined speed while it is being held between the capstan 54 and the pinch roller 120. The tape never becomes loosened.

The aforementioned operation can be summarized as stated hereunder. First, the tape cartridge 10 is inserted into the magnetic recording and reproducing apparatus. Then, the recording and playback button 15*b* is pushed. As soon as the capstan 54 and the takeup reel 56 begin to rotate, the plunger 58 is actuated. The delivery roller 59 enters into the tape cartridge 10 and bears against the tape 11 which is wound on the supply reel 12. The tape 11 is unwound from the supply reel and delivered out of the tape cartridge 10.

At the leading end of the tape 11, the first tape leader portion 105 is unwound from the supply reel 12 and led through the tape leader guide 104. When it reaches the takeup reel 56, it is automatically wound thereon. As soon as the tape leader portion begins to wind on the takeup reel 56, the microswitch 114 operates responsive to the tape tension. This operates the plunger 115 and brings the capstan 54 and pinch roller 120 to bear against each other. This moves the tape 11.

At the same time, the plunger 58 is rendered inoperative. The delivery roller 59 is moved away from the tape 11, and the tape 11 stops unwinding from the supply reel 12.

This concludes the operation of the automatically loading of the magnetic tape 11 in the magnetic recording and reproducing apparatus. The number of revolution of the takeup reel 56 is indicated by a counter 78.

To stop the movement of the tape 11, the stop button 15*d* is pushed. This unlocks the recording and playback button 15*b*. The biasing force of a spring 121 slides the lever 61 in a direction opposite to the direction of arrow A. The idlers 39 and 51 are moved away from the pulley 44 and are again brought to a position shown in FIG. 7. The lever 32 is moved in a direction opposite to the direction of arrow E. The brakeshoe 38 bears against the reel disc 22 to apply a brake. Thus, the tape 11 stops moving.

Figures 5, 6:
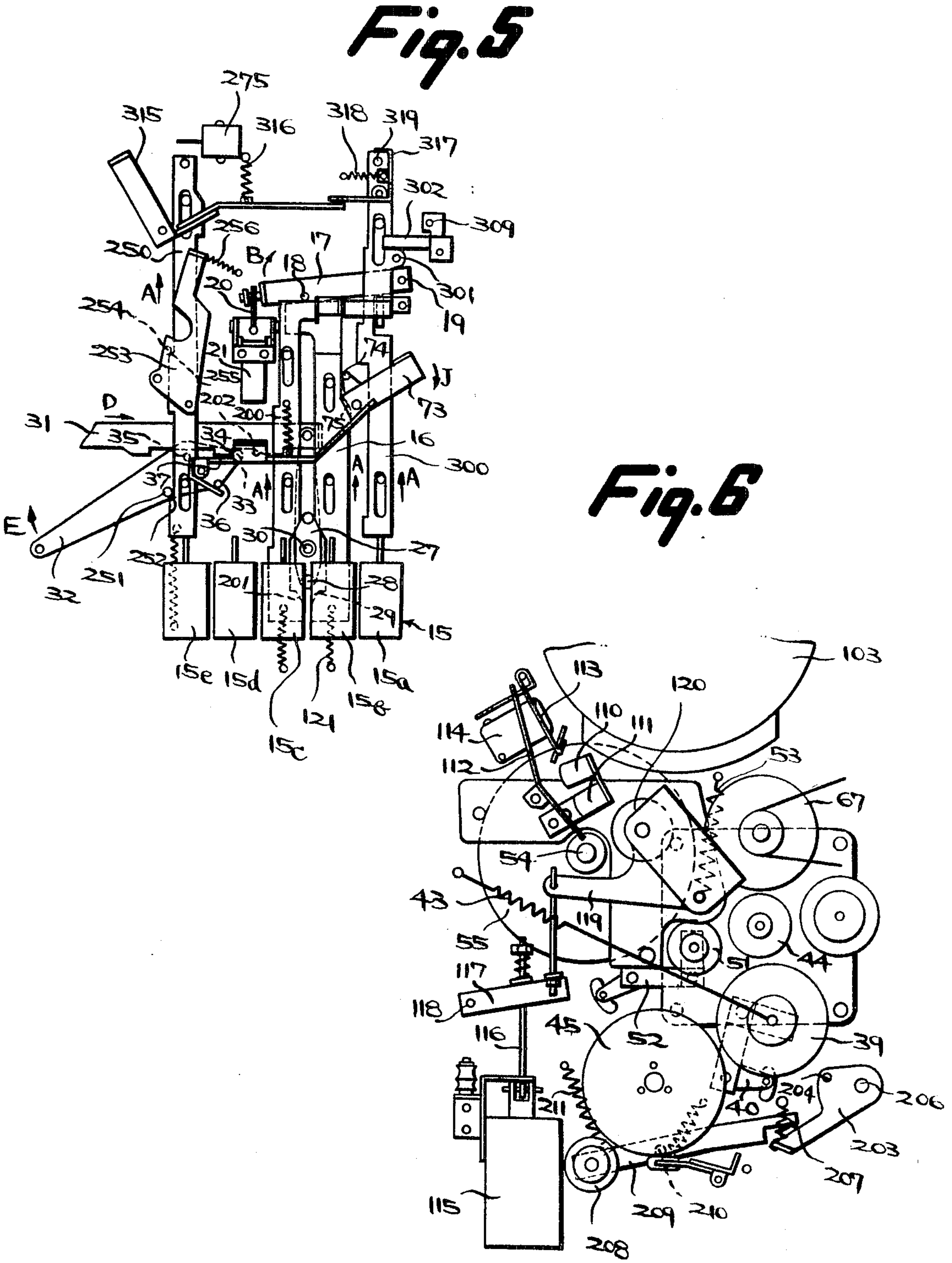
FIG. 5 is a plan view of pushbuttons and mechanisms associated therewith.
FIG. 6 and FIG. 7 are plan views of mechanisms for operating a capstan and a takeup reel respectively.

The operation of fast forward winding of the tape will now be explained. The fast winding button 15*c* is pushed and a sliding lever 200 moves in the direction of arrow A, as shown in FIG. 5. The shake lever 27 pivots in the counterclockwise direction, as the pin 28 is brought into engagement with a cam portion 201 of the lever 200. This causes the sliding lever 31 to slide in a direction opposite to the direction of arrow D.

Figure 7:
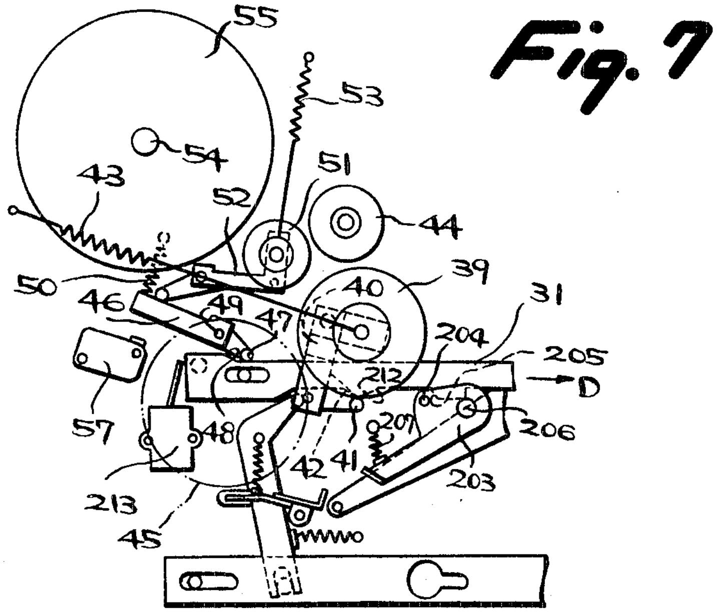

As the lever 31 slides, the pin 33 is brought into engagement with a cam portion 202 of the lever 31. The brake release lever 32 is moved in pivotal motion, in the direction of arrow E. The brake 38 is released from engagement with the reel disc 22, and the brake is released. The sliding movement of the lever 31 also causes a pin 204 mounted on a lever 203 to come into engagement with a cam portion 205 of the lever 31 as shown in FIG. 6 and FIG. 7. The lever 203 pivots in the counterclockwise direction about an arbor 206, against the biasing force of a spring 207. A lever 209 has one end which is engaged by the lever 203. The other end mounts a roller 208 which is pivoted by the biasing force of a spring 211. The pivotal motion is in the clockwise direction about an arbor 210. The roller 208 is brought to bear against the reel disc 45. At its forward end, the lever 31 pushes a switch 213.

Also, as the lever 31 slides, the pin 41 is brought into engagement with a cam portion 212 of the lever 31. The lever 40 pivots in the counterclockwise direction. The idler 39 is brought into engagement with the motor pulley 44 and the reel disc 45. Thus the rotation of the motor is transmitted the the reel disc 45.

The reel disc 45 consists of an upper disc and a lower disc mounted one over the other with a felt member interposed therebetween. Generally, in the recording and playback operation, the idler 39 is brought into engagement with the lower disc to operate the same. The rotational force of the lower disc is transmitted to the upper disc through the intermediate felt member, so that the takeup reel 56 can be rotated. However, the roller 208 is constructed so that it is simultaneously brought into engagement with the reel disc 45 and the upper disc and the lower disc. The rotational force applied by the idler 39 is directly transmitted to the upper disc. The force is not transmitted through the agency of the frictional force of the felt member. This permits the takeup reel 56 to rotate at high speed to effect fast winding.

During the fast winding of the tape 11, the plungers 58 and 115 are held inoperative. The delivery roller 59 remains out of engagement with the tape 11. The pinch roller 120 also remains out of engagement with the capstan 54.

The tape rewinding operation will now be explained. The rewinding button 15*e* is pushed to slide the lever 250 in the direction of arrow A, as shown in FIG. 5. At its forward end, it pushes a switch 275. A pin 251 is brought into engagement with a cam portion 252 of the lever 250. The lever 32 pivots in the direction of arrow E. This causes the brake 38 to move away from the reel disc 22, and thereby release the brake. A pivotal lever 253 pivots in the counterclockwise direction against the biasing force of a spring 256. A pin 254 mounted on the pivotal lever 253 is brought into engagement with a cam portion 255 of the lever 250.

As the lever 253 pivots, an idler 257 is brought into engagement with the pulley 44, as shown in FIG. 3. At the same time, an idler 258 is brought into engagement with the idler 257 and the reel disc 22. Accordingly, the rotational force of the pulley 44 is transmitted through the idlers 257 and 258 to the reel disc 22. Disc 22 then rotates in a direction which is opposite to the direction in which it rotates during the recording and playback operations. Thus, the tape 11 is rewound on the supply reel 12.

Figures 8, 9:
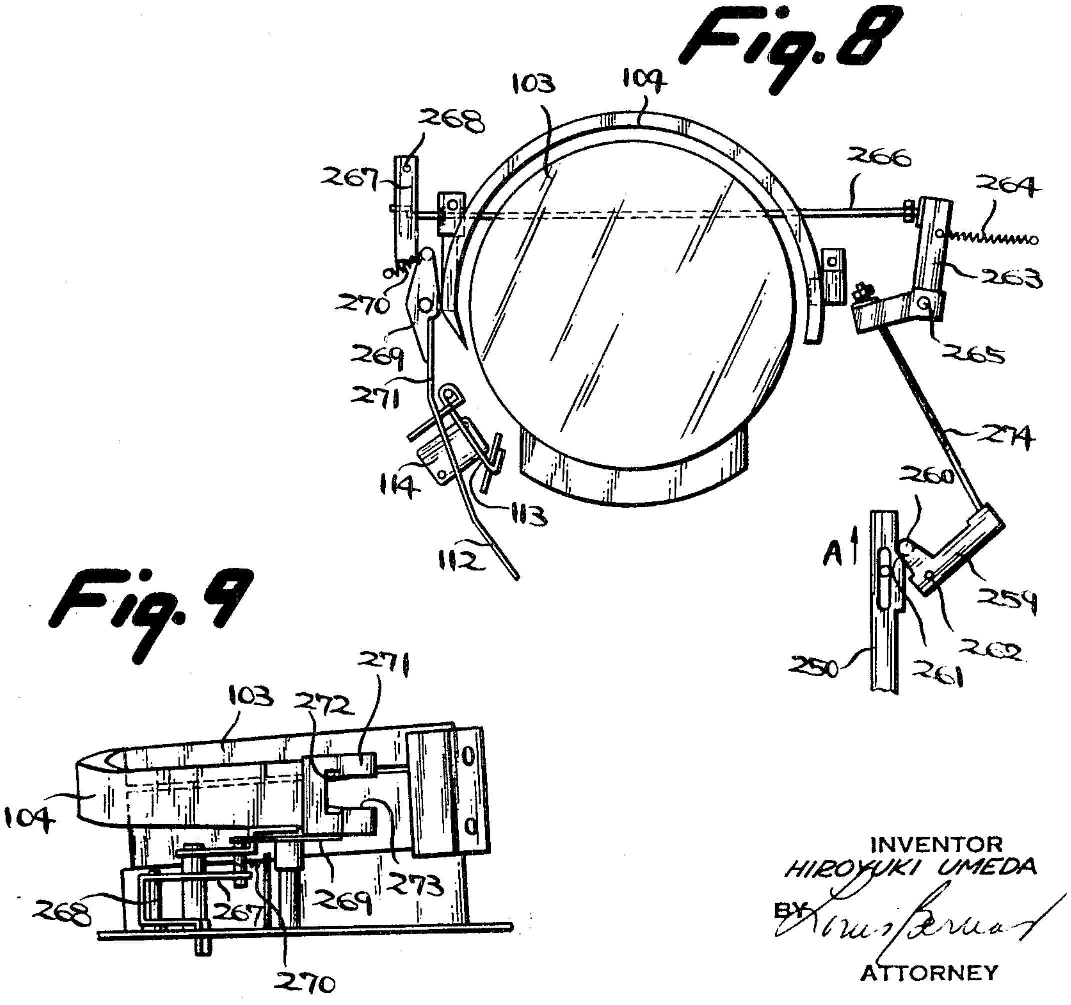
FIG. 8 and FIG. 9 are a plan view and a side view, respectively, of a tape leader guide mechanism.

As shown in FIG. 8, the sliding motion of the lever 250 brings a cam portion 261 thereof into engagement with a pin 260 mounted on a lever 259. The lever 259 pivots in the clockwise direction about an arbor 262. Accordingly, a lever 263 connected to the lever 259 through a connector 274 pivots in the counterclockwise direction about an arbor 265 and against the biasing force of a spring 264. A lever 267, connected to the lever 263 through a connector 266, pivots in the clockwise direction about an arbor 268. As the lever 267 pivots, a guide panel 269 is urged by a spring 270 to pivot in the counterclockwise direction. Thus, a forward panel portion 271 is brought into engagement with the tape 11.

As shown in FIG. 9, the panel portion 271 is formed substantially in the shape of a letter C, as is the case with the cross section of the tape guide 104. A large opening 272 has a width $L_2$, and a small opening 273 having a width $L_1$. On rewind, the magnetic tape passes between panel 271 and the drum, thereby pressing the panel 271 outwardly and away from the heads. When the narrow leader section 106 arrives at the slot 273, it enters the tape guide 104. This leads the hard leader section 105 into the tape guide at 272 and away from the heads.

Accordingly, when the first tape leader portion 105 is brought to the position of the panel section 271, it passes through the opening 272 and enters into the passage 107 of the leader guide 104. The remainder of the first tape leader portion 105 passes through the passage 107 and rewinds on the supply reel, without coming into contact with the guide drum 103.

Figure 17:
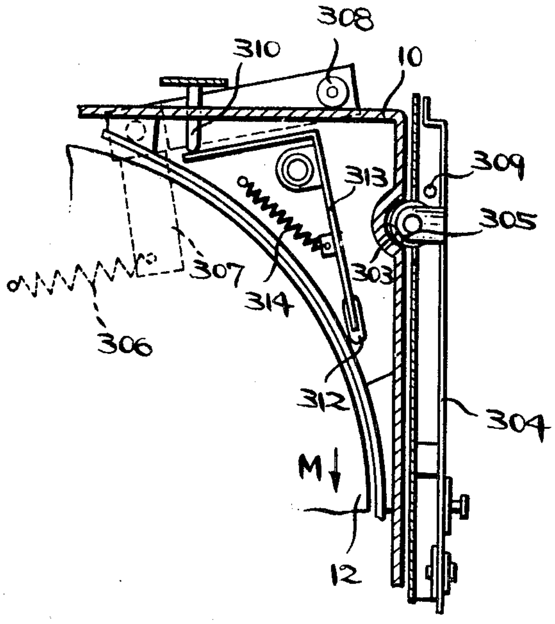
FIG. 17 and FIG. 18 are a plan view and a side view, respectively, of essential portions of a tape cartridge locking and unlocking mechanism.
Figure 18:
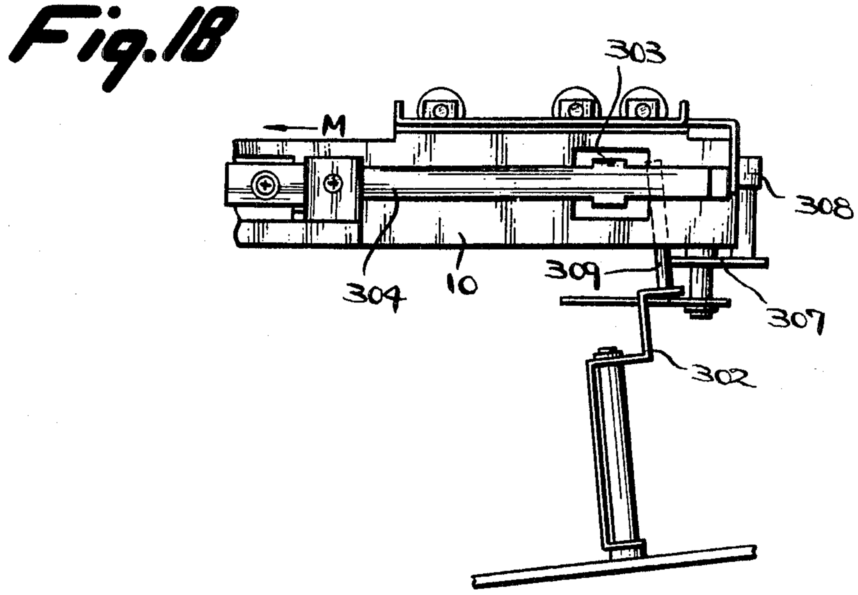

Finally, the removal of the tape cartridge 10 from the apparatus will be described. The tape cartridge removal button 15*a* is pushed. Then a sliding lever 300 slides in the direction of arrow A. A lever 302 pivots in the clockwise direction about a pin 301. As shown in FIG. 17 and FIG. 18, the tape cartridge 10 is formed with a recess 303 which is adapted to receive a roller 305 mounted on a plate spring 304, secured to the chassis of the apparatus. The roller 305 holds the tape cartridge 10 in a locked position. The forward end of the tape cartridge 10 pivots a lever 307 against the biasing force of a spring 306, when the tape cartridge 10 is inserted in the chassis of the apparatus. This lever 307 carries a pin 308.

Accordingly, when the forward end of the tape cartridge 10 is inserted in the chassis, it is subjected to the force of the spring 306. However, the arresting force exerted by the roller on the tape cartridge overcomes the biasing force exerted by the spring 306. Thus, the tape cartridge 10 is held in a locked position.

As the lever 302 pivots in the clockwise direction, a pin 309 causes the leaf spring 304 to be deflected in a direction away from the tape cartridge 10. This releases the roller 305 from its engagement in the recess 303. Accordingly, the pin 308 of the lever 307 is urged by the biasing force of the spring 306 to push the tape cartridge 10 in the direction of arrow M. When the tape cartridge 10 is inserted in the chassis, a pin 310 enters through an opening 311 in the tape cartridge. Pin 310 moves an L-shaped lever 313 having a brake pad 312 mounted thereon in the counterclockwise direction. The pad is held against the biasing force of a spring 314, to thereby release the brake applied to the tape 11 in the tape cartridge.

A tape detection lever 315 is mounted in a position so that it is brought into engagement with a portion of the tape 11 which emerges from the tape cartridge 10. When in engagement with the tape 11, the tape detection lever 315 is in a position shown in FIG. 5. It is so held under the influence of a tape tension which overcomes the biasing force of a spring 316.

Accordingly, the biasing force of a spring 318 pulls a lever 317 disposed in a position shown in FIG. 5. Therefore the lever 317 prevents the lever 300 from sliding because a pin 319 mounted on the lever 300 is engaged by the lever 317, even if the button 15*a* is pushed to move the lever 300 in sliding motion. The lever 302 is also prevented from moving in a pivotal motion.

Thus, it will be apparent that, when a portion of the tape 11, emerges from the tape cartridge 10, the cartridge removal mechanism cannot be actuated even if the button 15*a* is pushed. If the portion of the tape 11 emerges from the tape cartridge and is pulled back into the cartridge, the levers 315 and 317 pivots to a position shown in FIG. 3. This releases the pin 319 from its engagement with the lever 317. This permits the lever 300 to slide without any interference. Then, the tape cartridge 10 can be removed from the chassis of the apparatus.

In the embodiment of the invention described above, by virtue of the back tension on the tape, detection arm 113 and the switch 114 detect when the leader portion of the tape 11 has been automatically caught by the takeup reel 56. This indicates when the loading of the apparatus with the tape is completed. Another embodiment of the invention will be explained next with reference to FIG. 16. Parts similar to the parts shown in FIGS. 2A and 2B are designated by the same reference characters. Therefore, their description is omitted.

According to this embodiment, a light emitting portion 350 and a photocell 351 are disposed in face to face relationship. The tape 11 passes therebetween. In this embodiment, the tape leader portions 105 and 106 are transparent. Their lengths are such that the tape leader portions are positioned against the photocell 351 until their takeup reel.

After the tape cartridge 10 is inserted in the chassis of the apparatus, the recording and playback button 15*b* is pushed. The delivery roller 59 bears against the roll of tape wound on the supply reel 12. The roller unwinds the tape leader portions 105 and 106 and the tape 11 in succession. The photocell 351 performs the same function as the microswitch 114 of FIGS. 2A and 2B.

The plunger 58 is operative and the plunger 115 is inoperative as long as the photocell 351 receives light from the light emitting portion 350. This light is transmitted through the transparent tape leader portion 105 or 106. Further unwinding of the roll of tape 11 from the supply reel 12 causes the opaque tape portion 11 to pass in front of the photocell 351. The light from the light emitting portion 350 is blocked by the opaque tape 11. When the photocell 351 stops receiving light, it performs a switching action, the plunger 115 operates, and the plunger 58 is held inoperative.

This embodiment, eliminates the arm and other members which come into contact with the film. This prevents damage to the tape. The light emitting portion 350 and the photocell 351 may be mounted at any position as desired along the path of travel of the tape depending on the length of the tape leader portions.

I claim:

1. An automatic tape threading system for a magnetic recording and reproducing apparatus comprising a supply reel having a roll of magnetic tape wound thereon and a takeup reel on which said tape is wound, a tape leader connected to the leading end of said magnetic tape, said tape leader consisting of first and second leader portions, said first leader portion being a normally straight relatively hard flexible material having a slot therein, said first leader having a width which is the same as the width of said magnetic tape, said second leader portion being a relatively soft flexible material which does not damage a magnetic head tip when brought into direct contact with said tip, said second leader portion having a width which is less than the width of said magnetic tape, said second leader portion being disposed between said first leader portion and said magnetic tape, means comprising a delivery roller making contact with the outer periphery of said roll of tape for unwinding said tape leader and said magnetic tape, a guide drum having built-in rotary magnetic heads for recording and reproducing video signals, a leader guide for guiding said tape leader along a predetermined path of travel, said leader guide being mounted adjacent and spaced apart from the outer circumferential surface of said guide drum, said leader guide being further disposed obliquely with respect to the axis of said guide drum, said leader guide having a passage for said first leader portion to pass through with an opening which is provided along the tape path, said opening being wider than the width of said second leader portion and narrower than the width of said first leader portion, said first leader portion being at least long enough to reach from said supply reel to said takeup reel, said first leader portion being led through said passage of said tape guide, said second leader portion following said first leader portion and being led through said opening and escaping out of said tape guide whereby said second leader portion and the magnetic tape following said second leader portion travel along a path outside said tape guide and comes into engagement with the magnetic heads in said guide drum, and means comprising said tape takeup reel having a pawl for engaging said slot and thereby catching said first leader portion as the latter emerges from said leader guide for completing automatic threading of the magnetic tape through a predetermined path.

2. The system of claim 1 wherein said slot in said first leader portion is positioned to engage said pawl when said leader reaches said pawl, and a rotating capstan for moving the magnetic tape, a pinch roller, means for bringing the magnetic tape between said capstan and said pinch roller, means including an arm in engagement with said tape leader or said magnetic tape which pivots in response to the tensioning of the tape leader or the magnetic tape when the forward end of said pawl of the tape takeup reel catches said slot in said first leader portion, switch means opened and closed responsive to movement of said pivotal motion of said arm, means responsive to said switch means for releasing said delivery roller from engagement with said roll of tape, and means responsive to said switch means for causing said pinch roller to bear against said capstan.

3. The system of claim 1 which further comprises a rotatable capstan for moving the magnetic tape, a pinch roller, means for bringing the magnetic tape between said capstan aNd said pinch roller, means comprising light emitting means and a photocell positioned in face to face relationship with respect to each other and on the opposite sides of the tape path, said tape leader being made of a transparent material, means for releasing said delivery roller from engagement with said roll of the magnetic tape in response to cutting the light path between said light emitting means to said photocell when the magnetic tape replaces the transparent leader, and means for shifting said pinch roller to bear against said capstan in response to cutting said light path when the magnetic tape replaces the transparent leader so that said magnetic tape is held between the capstan and the pinch roller.

4. The system of claim 1 in which said leader guide has a substantially -C-shaped cross section, said guide being semicircular in longitudinal shape, said leader guide being constructed with a width such that only the first wide leader portion is able to pass therethrough, said second narrow leader portion escaping through the open part of said C-shaped section.

5. The system of claim 1 in which said first leader portion is formed with a slot in the forward end portion thereof, and said tape takeup reel comprises a reel hub formed in two sections for winding the leader and the tape on the peripheral surface thereof, a plurality of pivotal pawls mounted for pivotal motion through one of said reel hub sections, said pawl moving above and below the peripheral surface of said reel hub during said pivotal motion, a forward end on said pawl for catching said slot in said first leader portion, a plurality of springs for urging said pivotal pawl to move above the peripheral surface of said reel hub with a force which is less than the force required to wind the tape leader portion and the magnetic tape on the reel hub, and a plurality of arresting springs adapted to absorb the impact force applied to the pivotal pawl when the tape leader portion is caught by the pawl.

6. The system of claim 1 which further comprises a pivotal guide panel of substantially the same shape in cross section as said leader guide, said panel being mounted for pivotal motion, and means for bringing said guide panel into the tape path in the vicinity of the entrance to said leader guide by pivotal motion during the tape rewinding operation, said panel pressing against the tape leader portion and the magnetic tape during the tape rewinding operation.

7. The system of claim 1 which further comprises a tape cartridge containing said supply reel and having a recess on one side thereof, means for exerting a force on said tape cartridge, said force acting in the direction in which the tape cartridge moves when withdrawn from the apparatus, a resilient member engaging said recess of the tape cartridge for locking the tape cartridge in a locked position against said force, disengaging means for disengaging said resilient member from said recess to unlock the tape cartridge from said locked position, a pivotal tape detection lever brought into engagement with said tape leader or the magnetic tape and held under the influence of a tape tension which overcomes a biasing force which acts on said tape detection lever, and means for suppressing the operation of said disengaging means while said tape detection lever is held under the influence of the tension of said tape leader or the magnetic tape unwound from said tape cartridge.